(12) United States Patent
Liao et al.

(10) Patent No.: US 8,873,180 B2
(45) Date of Patent: Oct. 28, 2014

(54) SAMPLING-PHASE ACQUISITION BASED ON CHANNEL-IMPULSE-RESPONSE ESTIMATION

(71) Applicant: LSI Corporation, San Jose, CA (US)

(72) Inventors: Yu Liao, Longmont, CO (US); Haotian Zhang, Longmont, CO (US); Haitao Xia, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/856,210

(22) Filed: Apr. 3, 2013

(65) Prior Publication Data

US 2014/0254043 A1    Sep. 11, 2014

Related U.S. Application Data

(60) Provisional application No. 61/776,277, filed on Mar. 11, 2013.

(51) Int. Cl.
  *G11B 5/09* (2006.01)
  *G11B 27/30* (2006.01)
  *H04L 7/033* (2006.01)

(52) U.S. Cl.
  CPC .......... *G11B 27/3027* (2013.01); *H04L 7/0331* (2013.01)
  USPC .......................................................... 360/51

(58) Field of Classification Search
  CPC .................... G11B 20/1025; G11B 2020/1476
  See application file for complete search history.

(56) References Cited

U.S. PATENT DOCUMENTS

| | | | |
|---|---|---|---|
| 5,263,026 A | 11/1993 | Parr et al. | |
| 5,452,325 A | 9/1995 | Brown et al. | |
| 5,471,501 A | 11/1995 | Parr et al. | |
| 5,537,419 A | 7/1996 | Parr et al. | |
| 5,552,942 A | 9/1996 | Ziperovich et al. | |
| 6,751,250 B2 | 6/2004 | Kirke et al. | |
| 7,529,320 B2 | 5/2009 | Byrue et al. | |
| 2005/0180287 A1* | 8/2005 | Lee et al. | 369/59.15 |
| 2011/0002061 A1* | 1/2011 | Ozdemir | 360/31 |

\* cited by examiner

*Primary Examiner* — Daniell L Negron
(74) *Attorney, Agent, or Firm* — Hamilton DeSanctis & Cha

(57) ABSTRACT

Embodiments of the invention can be manifested as methods for converting analog waveforms into digital sampled signals. In at least one such embodiment, the method includes (i) sampling, based on a sampling-clock signal, an analog waveform received from a transmission channel to generate a digital sampled signal, (ii) generating a digital target signal by applying a specified reference data pattern to a model of the transmission channel, and (iii) adjusting the sampling-clock signal by comparing the digital sampled signal to the digital target signal. Embodiments of the invention can also be manifested as apparatuses that convert analog waveforms into digital sampled signals.

20 Claims, 2 Drawing Sheets

SAMPLING-PHASE ACQUISITION BASED ON CHANNEL-IMPULSE-RESPONSE ESTIMATION

CROSS-REFERENCE TO RELATED APPLICATIONS

This application claims the benefit of the filing date of U.S. provisional application No. 61/776,277, filed on Mar. 11, 2013, the teachings of all of which are incorporated herein by reference in their entirety.

BACKGROUND

1. Field of the Invention

Embodiments of the invention relate to analog-to-digital conversion, and, more specifically but not exclusively, to sampling-phase acquisition of analog-to-digital converters.

2. Description of the Related Art

In hard-disk drive (HDD) systems, a hard-disk platter is typically partitioned into concentric rings called tracks, and each track is further partitioned into smaller sections called sectors. Each sector typically stores a specified amount of user data (e.g., 512 bytes) and overhead information used by a read channel to recover the user data. For example, each sector may comprise, prior to the user data, a preamble that is used by the read channel to perform processing such as a zero-phase start and a zero-gain start, sampling-phase acquisition (also known as timing acquisition), and gain acquisition to lock on the user data stored on the corresponding sector. The zero-phase start and zero-gain start are performed to determine initial starting phase and gain, respectively, for the sampling-phase acquisition and gain acquisition, respectively. The preamble comprises a reference pattern known a priori to the read channel and is written each time that user data is written to a particular sector or a fragment of a sector.

When retrieving a sector of data from the hard-disk platter, a continuous-time analog waveform is obtained by passing a magneto-resistive read head over the hard-disk platter, and this readback waveform is sampled by the read channel using an analog-to-digital converter (ADC). The performance (e.g., Bit Error Rate (BER)) of the read channel in an HDD system is sensitive to the sampling phases at the ADC. Initially, the sampling phase at the ADC might not be a desired sampling phase (i.e., a sampling phase that ensures relatively good performance of the read channel); however, the sampling phase should be settled to a desired value before acquisition of the user data. Therefore, the read channel performs sampling-phase acquisition, wherein the sample phase (i.e., timing) is adjusted towards a desired sampling phase based on the preamble reference pattern known a priori to the read channel. The known reference pattern, and consequently the preamble, may be, for example, a 2T-pattern, which ensures that the corresponding analog readback waveform is a sinusoid with enough signal to noise ratio. The 2T-pattern refers to repetitions of a specific pattern, such as, a [1 1-1-1] pattern, which has a transition of −1 to 1 or 1 to −1 every 2T, where T is the time period allocated for every bit.

SUMMARY

Embodiments of the invention can be manifested as methods for converting analog waveforms into digital sampled signals. In at least one such embodiment, the method includes (i) sampling, based on a sampling-clock signal, an analog waveform received from a transmission channel to generate a digital sampled signal, (ii) generating a digital target signal by applying a specified reference data pattern to a model of the transmission channel, and (iii) adjusting the sampling-clock signal by comparing the digital sampled signal to the digital target signal. Embodiments of the invention can also be manifested as apparatuses that convert analog waveforms into digital sampled signals.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Figure 1:
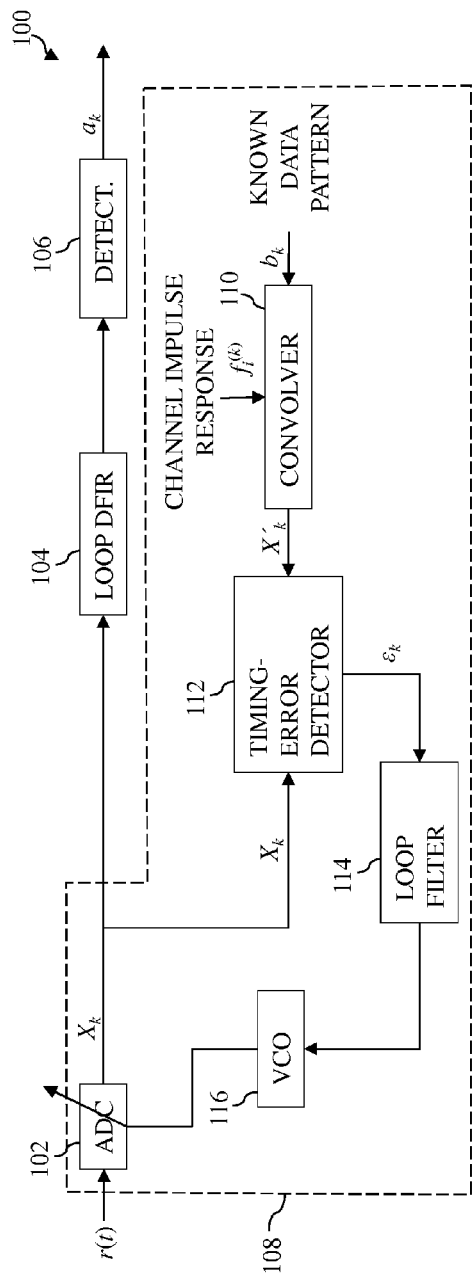
FIG. 1 shows a simplified block diagram of a receiver according to one embodiment of the disclosure.

FIG. 1 shows a simplified block diagram of a receiver 100 according to one embodiment of the disclosure that performs sampling phase acquisition. Receiver 100 may be a read channel in a data storage device that recovers data from a tangible storage medium, such as, but not limited to, a hard-disk drive. Alternatively, receiver 100 may be a receiver in another communications system, such as, but not limited to, an Ethernet communications system, a DSL communications system, and a chip-to-chip communications system, wherein such other communications system employs a known data pattern.

Receiver 100 comprises an analog-to-digital converter (ADC) 102 that converts an analog readback waveform r(t) from analog-to-digital format to generate digital samples $X_k$, where k is the sample index. The analog readback waveform r(t) may be preprocessed upstream using processing (not shown) that may vary depending on the particular application in which receiver 100 is implemented. For example, in a hard-disk drive, analog readback waveform r(t) may be preprocessed using processing such as variable-gain amplification, magneto-resistive-head asymmetry (MRA) compensation, baseline-wander compensation, and continuous-time filtering. For this discussion, suppose that receiver 100 is implemented in a hard-disk drive, and that sampling-phase acquisition is performed for data at the beginning of a sector on the hard-disk platter.

Initially, as the preamble portion of the analog readback waveform r(t) is received, phase-locked loop 108 performs sampling-phase acquisition to determine the proper timing for sampling of the user data by ADC 102. In particular, phase-locked loop 108 comprises a channel simulator that generates samples (herein referred to as "target samples") that are expected to be received by receiver 100 when the sampling phase is at a desired value by applying a reference data pattern known a priori by receiver 100 to a model of the transmission channel. The known reference data pattern is the same pattern written as the preamble portion of the analog readback waveform r(t) as described above. In this embodiment, the channel simulator comprises convolver 110, which convolves the known reference data pattern with a set of channel-impulse-response coefficients $f_i^{(k)}$ that model the transmission channel, where i is the coefficient index, to generate a target sample $X'_k$. The convolution operation may be represented, for example, as shown in Equation (1) as follows:

$$X'_k = \sum_{i=0}^{L-1} f_i^k \cdot b_{k-i} \quad (1)$$

where $b_{k-i}$ is the $(k-i)^{th}$ symbol of the known data pattern and L is the number of coefficients in the estimated channel-impulse response.

The channel-impulse-response coefficients $f_i^{(k)}$, which are not adapted during the sampling-phase acquisition, the zero-phase start (ZPS), or the zero-gain start (ZGS), are generated and updated by a channel-impulse-response estimator (not shown) during (i) calibration of receiver 100 (i.e., before sampling-phase acquisition) and (ii) tracking of the user data in the sector (i.e., after sampling-phase acquisition). The channel estimator, which is discussed in further detail below, may implement any suitable channel estimation algorithm, including but not limited to, a least-mean-squares (LMS) adaptation algorithm and a recursive-least squares algorithm.

The target sample $X'_k$ generated by convolver 110 corresponds to the desired sampling phase. Therefore, the sampling phase of ADC 102 is adapted with the object of matching the received sample $X_k$ generated by ADC 102 with the target sample $X'_k$. This adaptation process is performed using timing-error detector 112, loop filter 114, and voltage-controlled oscillator (VCO) 116. In particular, timing-error detector 112 generates a timing error $\epsilon_k$ based on the target sample $X'_k$ and the received sample $X_k$ generated by ADC 102. Timing-error detector 112, embodiments of which are described in further detail below, may be implemented using any suitable timing-error detection algorithm. The timing error $\epsilon_k$ is filtered by loop filter 114 to remove high-frequency noise and adjust adaptation speed, and the filtered timing error is applied to VCO 116, which generates a clock signal that is provided to ADC 102 to speed up, slow down, or hold steady the sampling timing of ADC 102 depending on whether the filtered timing error is positive, negative, or zero. This process is then repeated for additional received samples $X_k$ of the preamble portion of the readback waveform in attempt to match the received samples $X_k$ with the target samples $X'_k$.

After the preamble portion of the analog readback waveform r(t) has passed, ADC 102 converts the user-data portion of the analog readback waveform r(t) into digital user-data samples $X_k$. The digital user-data samples $X_k$ are filtered by loop digital finite-impulse-response filter (DFIR) 104, and detector 106 performs user data detection on the resulting filtered user-data samples, using, for example, a Viterbi detection algorithm or other suitable data detection algorithm, to generate estimated user-data symbols $\alpha_k$. The estimated user-data symbols $\alpha_k$ may then be processed downstream using processing (not shown) that may also vary depending on the particular application in which receiver 100 is implemented. For example, the estimated data symbols $\alpha_k$ may be processed using processing such as error-detection and error-correction decoding (e.g., low-density parity-check decoding, Reed-Solomon decoding).

Figure 2:
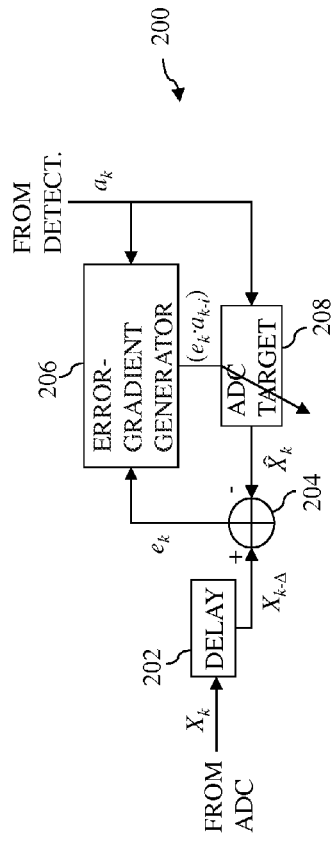
FIG. 2 shows a simplified block diagram of a channel-impulse-response estimator that may be used to generate the channel-impulse-response coefficients used by the convolver in FIG. 1 according to one embodiment of the disclosure.

FIG. 2 shows a simplified block diagram of a channel-impulse-response estimator 200 that may be used to generate the channel-impulse-response coefficients $f_i^k$ used by convolver 110 of FIG. 1 according to one embodiment of the disclosure. Channel-impulse-response estimator 200 estimates the channel-impulse response (i.e., updates the channel-impulse-response coefficients $f_i^k$) using an adaptive least-mean-squares algorithm during (i) calibration of the receiver (i.e., before sampling-phase acquisition) and also during (ii) tracking of the user data in the sector (i.e., after sampling-phase acquisition). As described above, the channel-impulse-response coefficients $f_i^k$ are not updated during the sampling-phase acquisition, the ZPS acquisition, or the ZGS acquisition.

In operation, channel-impulse-response estimator 200 receives a user-data sample $X_k$ from ADC 102 of FIG. 1 and a user-data symbol $\alpha_k$ from channel detector 106. ADC target block 208 updates the channel-impulse-response coefficients $f_i^k$ and generates a target sample $\hat{X}_k$ as shown in Equations (2) and (3), respectively, below:

$$f_i^{(k+1)} = f_i^k - \alpha \cdot (e_k \cdot a_{k-i}) \quad (2)$$

$$\hat{X}_k = \sum_{i=0}^{L-1} f_i^k \cdot a_{k-i} \quad (3)$$

where $\alpha$ is an update gain used to control the speed of adaptation and $e_k$ is an error signal. Note that Equation (3) is similar to Equation (1); however, the user-data symbols $\alpha_k$ are used in Equation (3) in lieu of symbols $b_k$ of the known data pattern.

The target sample $\hat{X}_k$ is provided to adder 204 along with a delayed user-data sample $X_{k-\Delta}$, which is delayed by delay element 202, and adder 204 generates the error signal $e_k$ as shown in Equation (4) as follows:

$$e_k = X_{k-\Delta} - \hat{X}_k \quad (4)$$

Error-gradient generator 206 updates the error gradient (i.e., the subtrahend of Equation (2)) based on the error signal $e_k$, the update gain $\alpha$, and the user-data symbol $\alpha_k$, and provides the error gradient to ADC target block 208. This process is repeated to drive the error signal $e_k$ toward zero.

Figure 3:
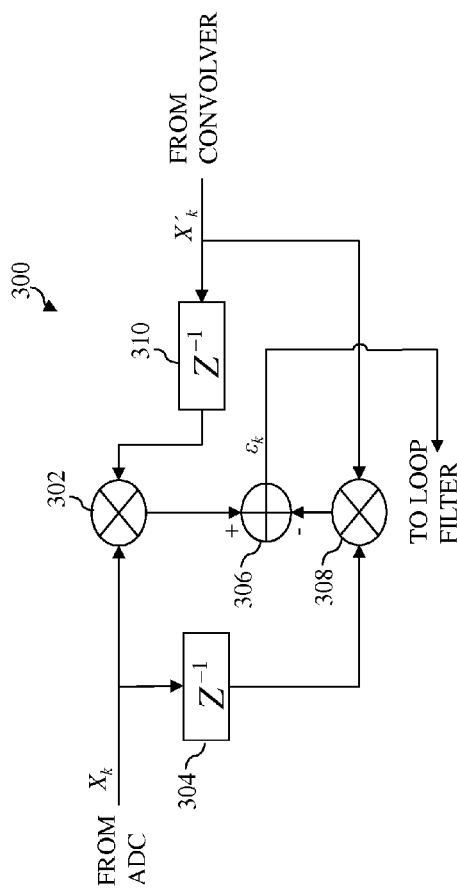
FIG. 3 shows a simplified block diagram of a timing-error detector that may be used to implement the timing-error detector in FIG. 1 according to one embodiment of the disclosure.

FIG. 3 shows a simplified block diagram of a timing-error detector 300 that may be used to implement timing-error detector 112 in FIG. 1 according to one embodiment of the disclosure. Timing-error detector 300 receives (i) samples $X_k$ of the readback waveform from ADC 102 and (ii) target samples $X'_k$ from convolver 110, and generates a timing error $\epsilon_k$ (also known as a sampling-phase error) using a baud-rate zero-forcing algorithm that may be represented as shown in Equation (5) below:

$$\epsilon_k = X_k \cdot X'_{k-1} - X_{k-1} \cdot X'_k \quad (5)$$

In operation, a received sample $X_k$ is delayed by delay element 304 and multiplied by a corresponding target sample $X'_k$ by multiplier 308 to generate the subtrahend of Equation (5). The target sample $X'_k$ is also delayed by delay element 310 and multiplied by the received sample $X_k$ by multiplier 302 to generate the minuend of Equation (5). The subtrahend is then subtracted from the minuend by adder 306 to generate the timing error $\epsilon_k$ as shown in Equation (5). As the sampling phase is acquired, the timing error $\epsilon_k$ is driven toward zero by the feedback loop formed by ADC 102, timing-error detector 112, loop filter 114, and VCO 116. When the timing error $\epsilon_k$ is equal to zero, the received sample $X_k$ is in phase with the target sample $X'_k$ and the received sample $X_{k-1}$ is in phase with target sample $X'_{k-1}$.

Timing-error detector 300 is robust to variable-gain offsets, meaning that variable-gain offsets do not affect the polarity of the timing error. Further, timing-error detector 300 is also robust to ZPS estimation error, meaning that relatively large phase offsets from the ZPS estimation are not propagated during sampling-phase acquisition.

Figure 4:
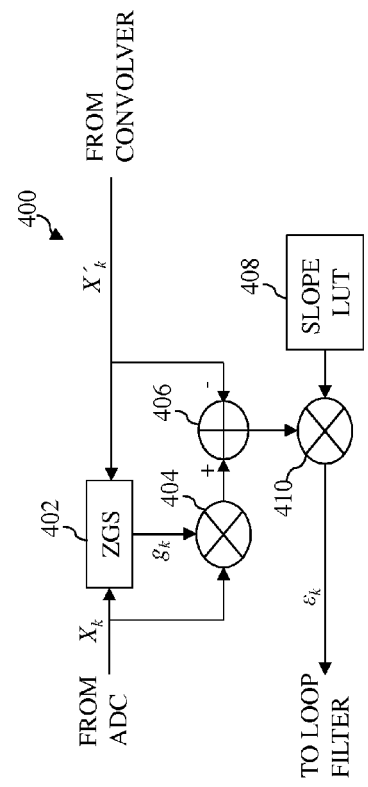
FIG. 4 shows a simplified block diagram of a timing-error detector that may be used to implement the timing-error detector in FIG. 1 according to another embodiment of the disclosure.

FIG. 4 shows a simplified block diagram of a timing-error detector 400 that may be used to implement timing-error detector 112 in FIG. 1 according to another embodiment of the disclosure. Timing-error detector 400 receives (i) samples $X_k$ of the readback waveform from ADC 102 and (ii) target samples $X'_k$ from convolver 110, and generates a timing error $\epsilon_k$ using a baud rate minimum-mean-square-error (MMSE) algorithm that may be represented as shown in Equation (6) below:

$$\epsilon_k = (g_k \cdot X_k - X'_k) \cdot slope_k \quad (6)$$

where $g_k$ is an estimated gain offset of the variable-gain amplifier (VGA) generated by zero-gain-start (ZGS) block 402, and $slope_k$ is the slope at the target sample $X'_k$ in the analog domain.

In operation, ZGS block 402 generates an estimated gain offset $g_k$ based on a received sample $X_k$ and a target sample $X'_k$. The estimated gain offset $g_k$ may be computed using any suitable ZGS algorithm. For example, in some embodiments, the variances of the received sample $X_k$ and target sample $X'_k$ can be estimated, and the estimated gain offset $g_k$ can be generated based on a comparison of the estimated variances.

Multiplier 404 multiplies the gain offset $g_k$ by the received sample $X_k$, adder 406 subtracts the target sample $X'_k$ from the resulting product. Multiplier 410 multiplies the resulting difference by a slope $slope_k$ retrieved from slope look-up table (LUT) 408 to generate the timing error $\epsilon_k$. The slopes $slope_k$ stored in LUT 408 may be computed prior to being stored in LUT 408 by, for example, passing the possible values that target samples $X'_k$ could assume through a differential filter. As the sampling phase is acquired, the timing error $\epsilon_k$ is minimized by the feedback loop formed by ADC 102, timing-error detector 112, loop filter 114, and VCO 116.

Compared to prior-art receivers, receivers of the current disclosure that perform sampling-phase acquisition based on channel-impulse-response estimation may reduce or eliminate altogether the propagation of ZPS estimation errors into the acquisition. Further, receivers of the disclosure may eliminate phase and gain errors that can result from phase rotating the received samples using a phase rotation filter as is done in some embodiments of the prior art. Thus, receivers of the disclosure may acquire the sampling phase with less sampling-phase offset and faster convergence, and as a result, the performance (e.g., bit-error rate) of receivers of the disclosure may be better than that of prior-art receivers.

Although the receiver in FIG. 1 implements a VCO, embodiments of the disclosure are not so limited. Alternative embodiments of the disclosure may be implemented using an oscillator other than a VCO, such as a numerically-controlled oscillator (NCO).

Further, in alternative embodiments of the disclosure, convolver 110 in FIG. 1 may be implemented as a look-up table that stores target samples $X'_k$, rather than a circuit that performs a convolution operation. In such embodiments, the target sample $X'_k$ that is provided to timing-error detector 112 may be generated by looking-up the target sample $X'_k$ in the look-up table using the user-data pattern.

Embodiments of the disclosure may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, or general-purpose computer.

Embodiments of the disclosure can be embodied in the form of methods and apparatuses for practicing those methods.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the method embodiments set forth herein are not necessarily required to be performed in the order described, and the order of the steps of such methods should be understood to be merely exemplary. Likewise, additional steps may be included in such method embodiments, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. An apparatus comprising:
   an analog-to-digital converter configured to sample, based on a sampling-clock signal, an analog waveform received from a transmission channel to generate a digital sampled signal;
   a channel simulator configured to generate a digital target signal by applying a specified reference data pattern to a model of the transmission channel; and
   a phase-locked loop configured to adjust the sampling-clock signal by comparing the digital sampled signal to the digital target signal.

2. The apparatus of claim 1, wherein the phase-locked loop comprises:
   a timing-error detector configured to generate a timing error based on the comparison of the digital sampled signal to the digital target signal; and an oscillator configured to adjust the sampling-clock signal based on the timing error.

3. The apparatus of claim 2, wherein the timing-error detector is configured to generate the timing error using a zero-forcing algorithm configured to drive the timing error towards a value of zero.

4. The apparatus of claim 3, wherein the timing error is proportional to:

$$X_k \cdot X'_{k-1} - X_{k-1} \cdot X'_k, \text{ wherein:}$$

$X_k$ is the $k^{th}$ sample of the digital sampled signal;
$X_{k-1}$ is the $(k-1)^{th}$ sample of the digital sampled signal;
$X'_k$ is the $k^{th}$ sample of the digital target signal; and
$X'_{k-1}$ is the $(k-1)^{th}$ sample of the digital target signal.

5. The apparatus of claim 2, wherein the timing-error detector is configured to generate the timing error using a minimum-mean-square-error algorithm configured to drive the timing error towards a minimum-mean-square value.

6. The apparatus of claim 5, wherein the timing error is proportional to:

$(g_k \cdot X_k - X'_k) \cdot \text{slope}_k$, wherein:

$X_k$ is the $k^{th}$ sample of the digital sampled signal;
$X'_k$ is the $k^{th}$ sample of the digital target signal;
$g_k$ is an estimated gain offset; and
$\text{slope}_k$ is a slope of target sample $X'_k$ in an analog domain.

7. The apparatus of claim 1, wherein:
the apparatus is implemented in a hard-disk drive system;
the digital sampled signal corresponds to a preamble stored in a sector in the hard-disk drive system, wherein the preamble represents the specified reference data pattern; and
the analog-to-digital converter is configured to generate a user-data sampled signal for user data stored in the sector based on the adjusted sampling-clock signal.

8. The apparatus of claim 1, wherein:
the model of the transmission channel is represented as a plurality of channel coefficients; and
the channel simulator comprises a convolver configured to convolve the channel coefficients by the specified reference data pattern to generate the digital target signal.

9. The apparatus of claim 8, wherein each sample of the digital target signal is proportional to:

$$\sum_{i=0}^{L-1} f_i^k \cdot b_{k-i},$$

wherein:
$f_i^k$ is the $i^{th}$ channel coefficient corresponding to a $k^{th}$ sample of the digital sampled signal;
$b_{k-i}$ is a $(k-i)^{th}$ symbol of the specified reference data pattern; and
L is a number of channel coefficients.

10. The apparatus of claim 8, further comprising:
a channel-impulse-response estimator configured to update the channel coefficients, wherein the channel-impulse-response estimator is configured to not update the channel coefficients while the channel simulator is generating the digital target signal.

11. The apparatus of claim 1, wherein the apparatus is configured to adjust the sampling-clock signal without rotating phases of samples of the digital sampled signal.

12. A method comprising:
(a) sampling, based on a sampling-clock signal, an analog waveform received from a transmission channel to generate a digital sampled signal;
(b) generating a digital target signal by applying a specified reference data pattern to a model of the transmission channel; and
(c) adjusting the sampling-clock signal by comparing the digital sampled signal to the digital target signal.

13. The method of claim 12, wherein step (b) comprises:
(b1) generating a timing error based on the comparison of the digital sampled signal to the digital target signal; and
(b2) adjusting the sampling-clock signal based on the timing error.

14. The method of claim 13, wherein step (b1) comprises generating the timing error using a zero-forcing algorithm configured to drive the timing error towards a value of zero.

15. The method of claim 14, wherein the timing error is proportional to:

$$X_k \cdot X'_{k-1} - X_{k-1} \cdot X'_k, \text{ wherein:}$$

$X_k$ is the $k^{th}$ sample of the digital sampled signal;
$X_{k-1}$ is the $(k-1)^{th}$ sample of the digital sampled signal;
$X'_k$ is the $k^{th}$ sample of the digital target signal; and
$X'_{k-1}$ is the $(k-1)^{th}$ sample of the digital target signal.

16. The method of claim 13, wherein step (b1) comprises generating the timing error using a minimum-mean-square-error algorithm configured to drive the timing error towards a minimum-mean-square value.

17. The method of claim 16, wherein the timing error is proportional to:

$(g_k \cdot X_k - X'_k) \cdot \text{slope}_k$, wherein:

$X_k$ is the $k^{th}$ sample of the digital sampled signal;
$X'_k$ is the $k^{th}$ sample of the digital target signal;
$g_k$ is an estimated gain offset; and
$\text{slope}_k$ is a slope of target sample $X'_k$ in an analog domain.

18. The method of claim 12, wherein:
the method is implemented in a hard-disk drive system;
the digital sampled signal corresponds to a preamble stored in a sector in the hard-disk drive system, wherein the preamble represents the specified reference data pattern; and
the method further comprises (d) generating a user-data sampled signal for user data stored in the sector based on the sampling-clock signal adjusted in step (c).

19. The method of claim 12, wherein:
the model of the transmission channel is represented as a plurality of channel coefficients; and
step (b) comprises convolving the channel coefficients by the specified reference data pattern to generate the digital target signal.

20. The method of claim 19, wherein each sample of the digital target signal is proportional to:

$$\sum_{i=0}^{L-1} f_i^k \cdot b_{k-i},$$

wherein:
$f_i^k$ is the $i^{th}$ channel coefficient corresponding to a $k^{th}$ sample of the digital sampled signal;
$b_{k-i}$ is a $(k-i)^{th}$ symbol of the specified reference data pattern; and
L is a number of channel coefficients.

* * * * *